United States Patent
Igeta

(10) Patent No.: US 12,510,792 B2
(45) Date of Patent: Dec. 30, 2025

(54) LIQUID CRYSTAL ELEMENT AND LIQUID CRYSTAL ELEMENT MANUFACTURING METHOD

(71) Applicant: Magnolia White Corporation, Tokyo (JP)

(72) Inventor: Koichi Igeta, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 24 days.

(21) Appl. No.: 18/644,351

(22) Filed: Apr. 24, 2024

(65) Prior Publication Data

US 2024/0272505 A1 Aug. 15, 2024

Related U.S. Application Data

(63) Continuation of application No. PCT/JP2022/037124, filed on Oct. 4, 2022.

(30) Foreign Application Priority Data

Nov. 1, 2021 (JP) .................................. 2021-178750

(51) Int. Cl.
G02F 1/137 (2006.01)
G02F 1/1333 (2006.01)
G02F 1/1337 (2006.01)

(52) U.S. Cl.
CPC .... *G02F 1/13718* (2013.01); *G02F 1/133305* (2013.01); *G02F 1/133723* (2013.01); *G02F 1/133788* (2013.01)

(58) Field of Classification Search
CPC ........... G02F 1/13718; G02F 1/133305; G02F 1/133723; G02F 1/133788; B32B 7/06; B32B 37/02; G02B 5/18; G02B 5/30
See application file for complete search history.

(56) References Cited

U.S. PATENT DOCUMENTS

| 5,650,787 A * | 7/1997 | Lim .......................... H01Q 3/22 343/768 |
| 2004/0164274 A1* | 8/2004 | Solomonson .......... C09K 19/52 252/299.61 |
| 2008/0106682 A1* | 5/2008 | Matsui .................. G02F 1/1393 349/117 |

(Continued)

FOREIGN PATENT DOCUMENTS

| CN | 112882268 A * | 6/2021 | ............. G01N 21/29 |
| JP | 2000-310704 A | 11/2000 | |

(Continued)

OTHER PUBLICATIONS

English Machine Translation of Kiyohara et al., WIPO WO 2107/191755 (Year: 2024).*

(Continued)

*Primary Examiner* — Donald L Raleigh
(74) *Attorney, Agent, or Firm* — Maier & Maier, PLLC

(57) ABSTRACT

According to one embodiment, a liquid crystal element manufacturing method includes forming an alignment layer on a support body, forming a cholesteric liquid crystal layer on the alignment layer, forming an adhesive layer on the cholesteric liquid crystal layer, adhering a substrate having stretchability by the adhesive layer, and peeling the cholesteric liquid crystal layer from the alignment layer.

12 Claims, 8 Drawing Sheets

(56) References Cited

U.S. PATENT DOCUMENTS

2012/0320312 A1* 12/2012 Yang ................... G02F 1/1334
359/296
2018/0004017 A1* 1/2018 Hatsumi ............... G02F 1/0045

FOREIGN PATENT DOCUMENTS

JP    2020-131638 A    8/2020
WO   WO-2017191755 A1 * 11/2017 ........... B42D 25/364

OTHER PUBLICATIONS

English Machine Translation of Hahn et al., Chinese Pub. No. CN 112 882 268 (Year: 2024).*
International Search Report issued Dec. 27, 2022, in corresponding International Application No. PCT/JP2022/037124, 11 pages.
Office Action issued on Mar. 18, 2025, in corresponding Japanese Application No. 2023-556250, 8 pages.

* cited by examiner

LIQUID CRYSTAL ELEMENT AND LIQUID CRYSTAL ELEMENT MANUFACTURING METHOD

CROSS-REFERENCE TO RELATED APPLICATIONS

This application is a Continuation application of PCT Application No. PCT/JP2022/037124, filed Oct. 4, 2022 and based upon and claiming the benefit of priority from Japanese Patent Application No. 2021-178750, filed Nov. 1, 2021, the entire contents of all of which are incorporated herein by reference.

FIELD

Embodiments described herein relate generally to a liquid crystal element and a liquid crystal element manufacturing method.

BACKGROUND

In recent years, various types of liquid crystal elements using cholesteric liquid crystal have been considered. The cholesteric liquid crystal has a property of reflecting light having a specific wavelength depending on a helical pitch. In one example, a composite structure with a cholesteric liquid crystal elastomer between a pair of substrates has been proposed.

Embodiments described herein aim to provide a liquid crystal element having stretchability and a manufacturing method capable of easily manufacturing the liquid crystal element.

DETAILED DESCRIPTION

Figure 1:
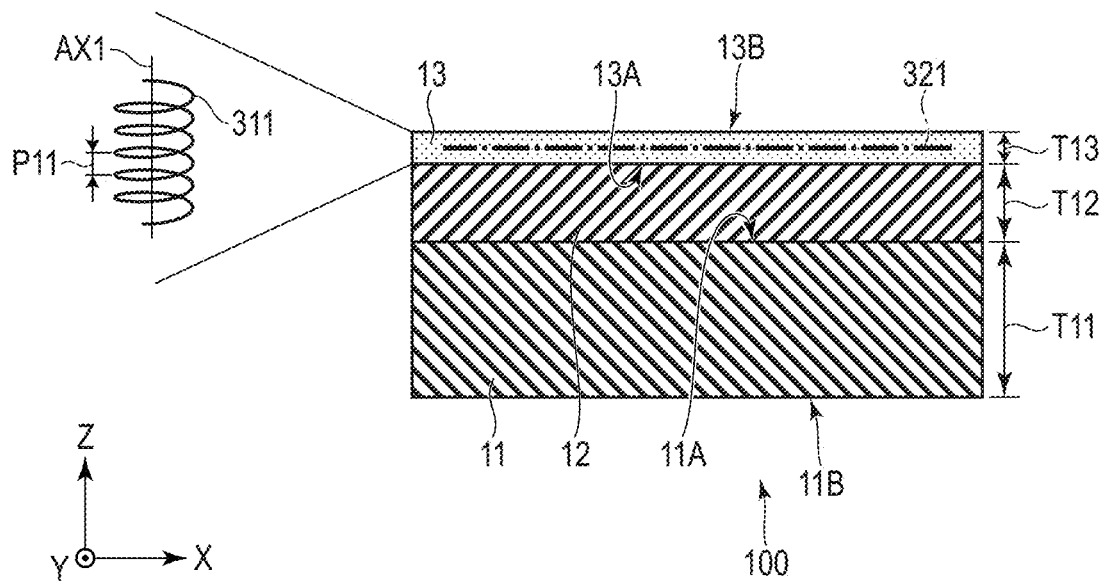
FIG. 1 is a cross-sectional view showing an example of a liquid crystal element 100 according to an embodiment.

In general, according to one embodiment, a liquid crystal element manufacturing method comprises: forming an alignment layer on a support body; forming a cholesteric liquid crystal layer on the alignment layer; forming an adhesive layer on the cholesteric liquid crystal layer; adhering a substrate having stretchability by the adhesive layer; and peeling the cholesteric liquid crystal layer from the alignment layer.

According to another embodiment, a liquid crystal element comprises: a substrate having stretchability; an adhesive layer arranged on the substrate; and a first cholesteric liquid crystal layer containing a plasticizer, being adhered to the adhesive layer, and having stretchability.

According to yet another embodiment, there is provided a liquid crystal element having stretchability and a manufacturing method capable of easily manufacturing the liquid crystal element.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis and a Z-axis orthogonal to each other are described to facilitate understanding as needed. A direction along the X-axis is referred to as an X-direction or a first direction, a direction along the Y-axis is referred to as a Y-direction or a second direction, and a direction along the Z-axis is referred to as a Z-direction or a third direction. A plane defined by the X-axis and the Y-axis is referred to as an X-Y plane. Viewing the X-Y plane is referred to as plan view. The first direction X and the second direction Y correspond to, for example, directions parallel to a main surface of a substrate included in the liquid crystal device 100, and the third direction Z corresponds to a thickness direction of the liquid crystal element 100.

FIG. 1 is a cross-sectional view showing an example of a liquid crystal element 100 according to an embodiment.

The liquid crystal element 100 comprises a substrate 11, an adhesive layer 12, and a cholesteric liquid crystal layer (first cholesteric liquid crystal layer) 13. The adhesive layer 12 is located between the substrate 11 and the cholesteric liquid crystal layer 13 in the third direction Z.

The substrate 11 is a resin substrate having stretchability. In addition, the substrate 11 is, for example, transparent. As materials for forming the substrate 11, for example, rubber materials such as silicone rubber, fluororubber, chloroprene rubber, nitrile rubber, and ethylene propylene rubber, thermoplastic elastomer such as polystyrene, olefin/alkene, polyvinyl chloride, polyurethane, polyester, and polyamide, other resins having rubber (elastomer)-like properties can be applied.

The substrate 11 has a main surface (inner surface) 11A and a main surface (outer surface) 11B on a side opposite to the main surface 11A. The main surface 11A and the main surface 11B are the surfaces parallel to the X-Y plane. The substrate 11 has a thickness T11 in the third direction Z.

The adhesive layer 12 is located on the substrate 11 and is in contact with the main surface 11A. In addition, the adhesive layer 12 is, for example, transparent. The adhesive layer 12 has stretchability, similarly to the substrate 11. Examples of materials for forming the adhesive layer 12 including adhesives such as acrylic resins, enethiol resins, epoxy resins, silicone resins, polyvinyl alcohol resins, polyvinyl acetal resins, and polyvinyl butyral resins, optical adhesive sheets, and the like are applicable. The material of the adhesive layer 12 is appropriately selected in accordance with the physical properties of the material of the substrate 11 and the like.

The adhesive layer 12 has a thickness T12 in the third direction Z. The thickness T12 is smaller than the thickness T11.

The cholesteric liquid crystal layer 13 is adhered to the adhesive layer 12. The cholesteric liquid crystal layer 13 has stretchability, similarly to the substrate 11. The cholesteric liquid crystal layer 13 is formed using, for example, a mixture obtained by adding a plasticizer and a cross-linking agent to a polymerizable liquid crystal monomer, a polymerizable chiral liquid crystal monomer, and a photoinitiator.

Examples of photoinitiators including alkylphenone-based photopolymerization initiator (Omnirad 651), acylphosphine oxide-based photopolymerization initiator (Omnirad TPO H), intramolecular hydrogen abstraction type photopolymerization initiator (Omnirad MBF), intramolecular hydrogen abstraction type photopolymerization initiator (Irgacure OXE01), a cationic photopolymerization initiator (Omnirad 250), and the like are applicable.

As the plasticizer, for example, a single-component nematic liquid crystal such as 4-cyano-4'-pentylbiphenyl (5CB), nematic liquid crystal comprised of a plurality of components, or the like can be applied.

As the cross-linking agent, 1,6-hexanediol diacrylate, 1,4-butanediol diacrylate, trimethylolpropane triacrylate, and the like can be applied.

The cholesteric liquid crystal layer 13 has a main surface (inner surface) 13A that is in contact with the adhesive layer 12 and a main surface (outer surface) 13B on a side opposite to the main surface 13A. The main surface 13A and the main surface 13B are the surfaces substantially parallel to the X-Y plane. The cholesteric liquid crystal layer 13 has a thickness T13 in the third direction Z. The thickness T13 is smaller than the thickness T12. The thickness T13 is, for example, 1 μm to 10 μm, desirably 2 μm to 7 μm.

The main surface 11B is in contact with a low refractive index medium having a refractive index smaller than that of the substrate 11. Similarly, the main surface 13B is in contact with a low refractive index medium having a refractive index smaller than that of the cholesteric liquid crystal layer 13. The low refractive index medium is, for example, air. The main surface 11B and the main surface 13B can form a light incident surface of the liquid crystal element 100.

The cholesteric liquid crystal layer 13 includes cholesteric liquid crystals (first cholesteric liquid crystals) 311 swirling in a first swirling direction as schematically shown in an enlarged manner. The cholesteric liquid crystal 311 has a helical axis AX1 substantially parallel to the third direction Z, and a helical pitch P11 along the third direction Z. The helical pitch P11 indicates one helical period (i.e., the layer thickness along the helical axis AX1 required for liquid crystal molecules to rotate 360 degrees).

The cholesteric liquid crystal layer 13 has a reflective surface 321. Circularly polarized light in a selective reflection wavelength range determined in accordance with the helical pitch and the refractive index anisotropy, of the light made incident on the cholesteric liquid crystal layer 13, is reflected on the reflective surface 321. For example, clockwise circularly polarized light is reflected on the reflecting surface 321 when the first swirling direction is a clockwise direction, and counterclockwise circularly polarized light is reflected on the reflecting surface 321 when the first swirling direction is a counterclockwise direction. In the present specification, "reflection" in the cholesteric liquid crystal layer 13 is accompanied by diffraction inside the cholesteric liquid crystal layer 13. In addition, in the present specification, circularly polarized light may be strict circularly polarized light or circularly polarized light which approximates elliptically polarized light.

According to the present embodiment, the liquid crystal element 100 having stretchability can be provided.

Figure 2:
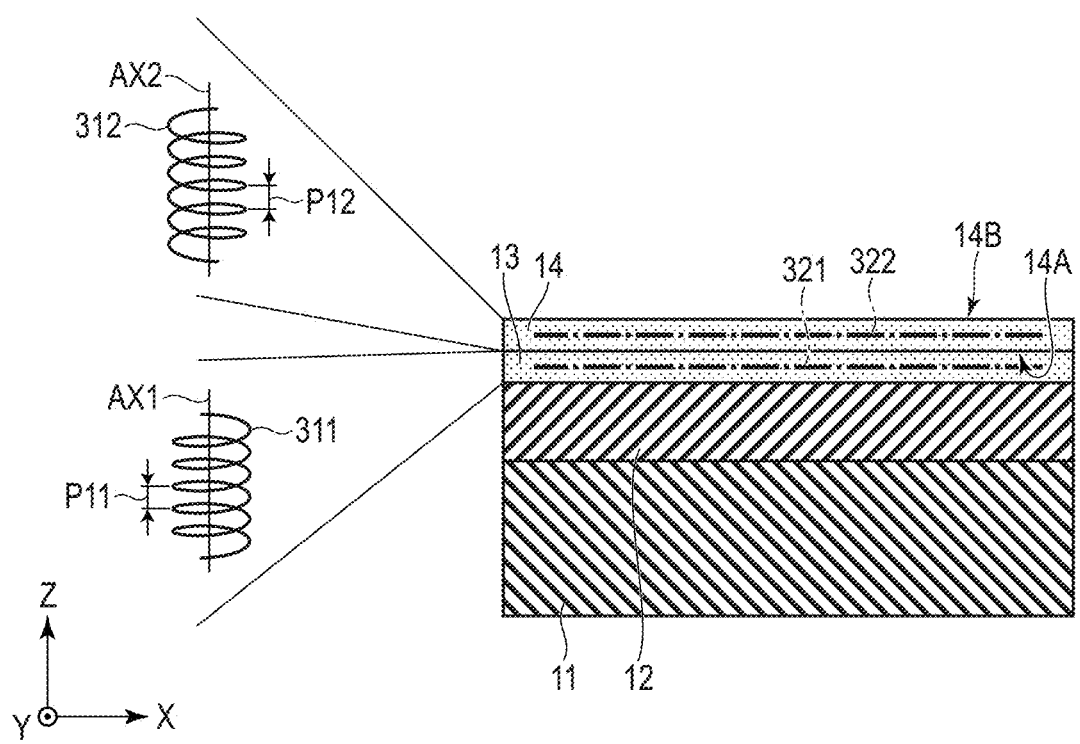
FIG. 2 is a cross-sectional view showing another example of the liquid crystal element 10 according to the embodiment.

FIG. 2 is a cross-sectional view showing another example of the liquid crystal element 100 according to the present embodiment.

The example shown in FIG. 2 is different from the example shown in FIG. 1 in that the liquid crystal element 100 comprises a cholesteric liquid crystal layer (second cholesteric liquid crystal layer) 14 arranged on the cholesteric liquid crystal layer (first cholesteric liquid crystal layer) 13. The cholesteric liquid crystal layer 14 is formed of the same material as the cholesteric liquid crystal layer 13 and has stretchability.

The cholesteric liquid crystal layer 14 has a main surface (inner surface) 14A and a main surface (outer surface) 14B on a side opposite to the main surface 14A. The main surface 14A and the main surface 14B are the surfaces substantially parallel to the X-Y plane. The main surface 14B can form a light incident surface.

Incidentally, an alignment film or an adhesive layer may be interposed between the cholesteric liquid crystal layer 13 and the cholesteric liquid crystal layer 14 in some cases.

The cholesteric liquid crystal layer 14 includes cholesteric liquid crystals (second cholesteric liquid crystals) 312 swirling in a second swirling direction opposite to the first swirling direction as schematically shown in an enlarged manner. The cholesteric liquid crystal 312 has a helical axis AX2 substantially parallel to the third direction Z, and a helical pitch P12 along the third direction Z. The helical axis AX2 is parallel to the helical axis AX1. The helical pitch P12 is equivalent to the helical pitch P11. The helical pitch P12 may be different from the helical pitch P11.

The cholesteric liquid crystal layer 14 has a reflective surface 322.

In the liquid crystal element 100 of such an example, the reflective surface 321 of the cholesteric liquid crystal layer 13 reflects the first circularly polarized light corresponding to the first swirling direction of the cholesteric liquid crystal 311 in the selective reflection wavelength range. In addition, the reflective surface 322 of the cholesteric liquid crystal layer 14 reflects the second circularly polarized light corresponding to the second swirling direction of the cholesteric liquid crystal 312 in the selective reflection wavelength range.

When the helical pitch P11 and the helical pitch P12 are equal to each other, the selective reflection wavelength range of the cholesteric liquid crystal 311 is equal to the selective reflection wavelength range of the cholesteric liquid crystal 312. Therefore, the first circularly polarized light and the second circularly polarized light in the selective reflection wavelength range can be reflected, and the reflectance in the selective reflection wavelength range can be improved.

When the helical pitch P11 and the helical pitch P12 are different from each other, the selective reflection wavelength range of the cholesteric liquid crystal 311 is different from the selective reflection wavelength range of the cholesteric liquid crystal 312. Therefore, the selective reflection wavelength range of the liquid crystal element 100 can be widened.

Figure 3:
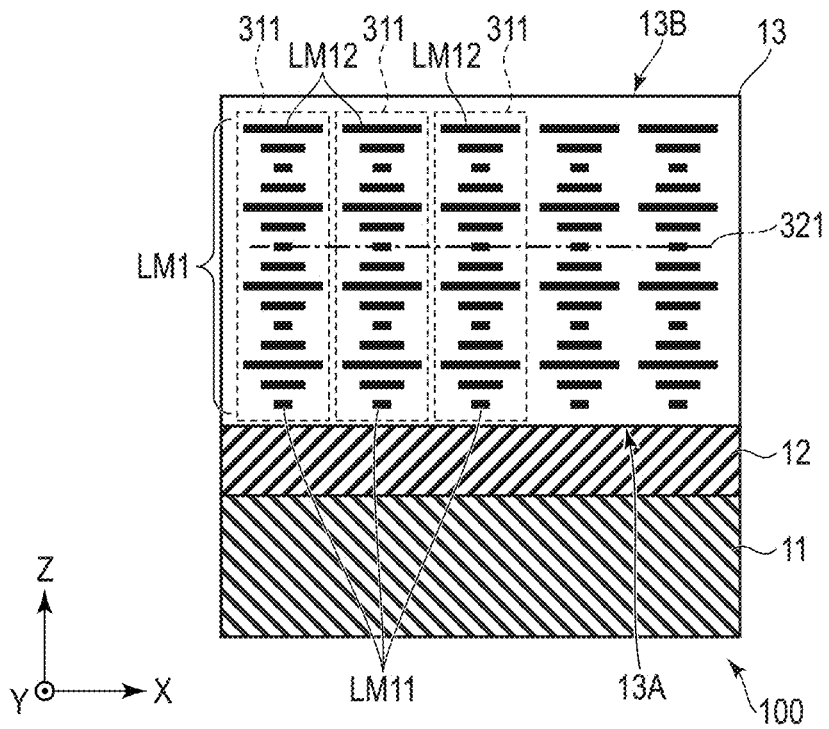
FIG. 3 is a view illustrating an example of the cholesteric liquid crystal 311 contained in the cholesteric liquid crystal layer 13.

FIG. 3 is a view illustrating an example of the cholesteric liquid crystal 311 contained in the cholesteric liquid crystal layer 13.

The cholesteric liquid crystal layer 13 is enlarged in the third direction Z in FIG. 3. In addition, for simplification, one liquid crystal molecule LM1 among a plurality of liquid crystal molecules located on the same plane parallel to the X-Y plane is shown as the liquid crystal molecule LM1 forming the cholesteric liquid crystal 311. The illustrated alignment direction of the liquid crystal molecule LM1 corresponds to an average alignment direction of a plurality of liquid crystal molecules located on the same plane.

When one cholesteric liquid crystal 311 is focused, the cholesteric liquid crystal 311 is comprised of a plurality of liquid crystal molecules LM1 helically stacked along the Z direction while swirling. The plurality of liquid crystal molecules LM1 include a liquid crystal molecule LM11 on one end side of the cholesteric liquid crystal 311 and a liquid crystal molecule LM12 on the other end side of the cholesteric liquid crystal 311. The liquid crystal molecule LM11 is close to the main surface 13A or the adhesive layer 12. The liquid crystal molecule LM12 is close to the main surface 13B.

In the cholesteric liquid crystal layer 13 of the illustrated example, the alignment directions of the plurality of cholesteric liquid crystals 311 adjacent along the first direction X are arranged in one direction. In other words, the alignment directions of the plurality of liquid crystal molecules LM11 adjacent along the first direction X substantially correspond to each other. In addition, the alignment directions of the plurality of liquid crystal molecules LM12 adjacent along the first direction X also correspond to each other.

The reflective surface 321 of the cholesteric liquid crystal layer 13 is formed in a planar shape extending along the X-Y plane. The reflective surface 321 is equivalent to a surface in which the alignment directions of the liquid crystal molecules LM1 are arranged or a surface in which the spatial phases are arranged (an equiphase wave surface).

Such a liquid crystal layer 13 is cured such that the alignment directions of the liquid crystal molecules LM1 are fixed. In other words, the alignment directions of the liquid crystal molecules LM1 are not controlled in accordance with the electric field. For this reason, the liquid crystal element 100 does not comprise an electrode for forming an electric field in the cholesteric liquid crystal layer 13.

Figure 4:
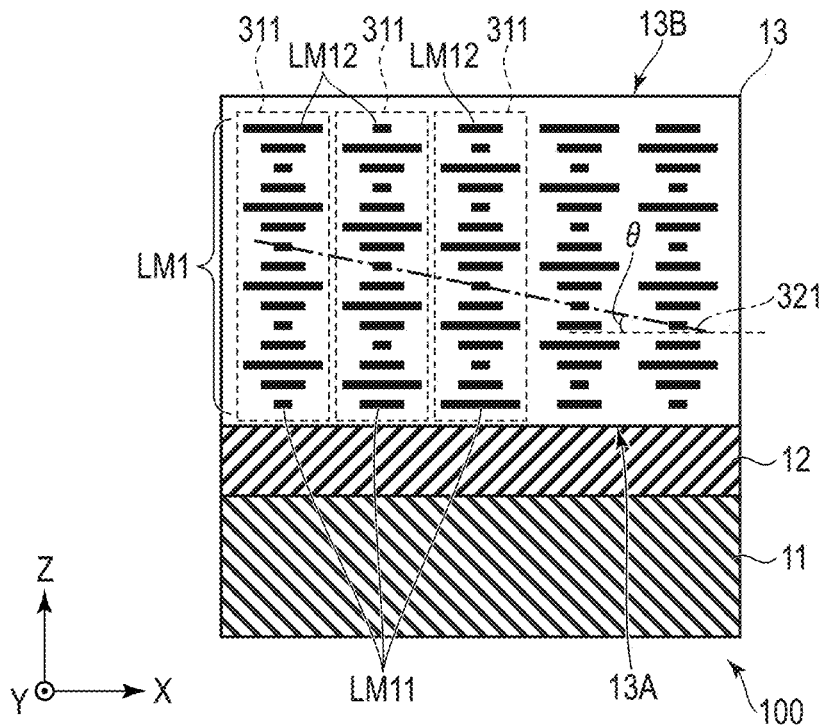
FIG. 4 is a view illustrating another example of the cholesteric liquid crystal 311 contained in the cholesteric liquid crystal layer 13.

FIG. 4 is a view illustrating another example of the cholesteric liquid crystal 311 contained in the cholesteric liquid crystal layer 13.

The example shown in FIG. 4 is different from the example shown in FIG. 3 in that the alignment directions of the plurality of cholesteric liquid crystals 311 adjacent along the first direction X are different from each other. Then, the alignment directions of the plurality of liquid crystal molecules LM11 change continuously along the first direction X. In addition, the alignment directions of the plurality of liquid crystal molecules LM12 also change continuously along the first direction X. These alignment directions will be described later.

The reflective surface 321 of the cholesteric liquid crystal layer 13 is inclined with respect to the X-Y plane. An angle θ formed between the reflective surface 321 and the X-Y plane is an acute angle.

Figure 5:
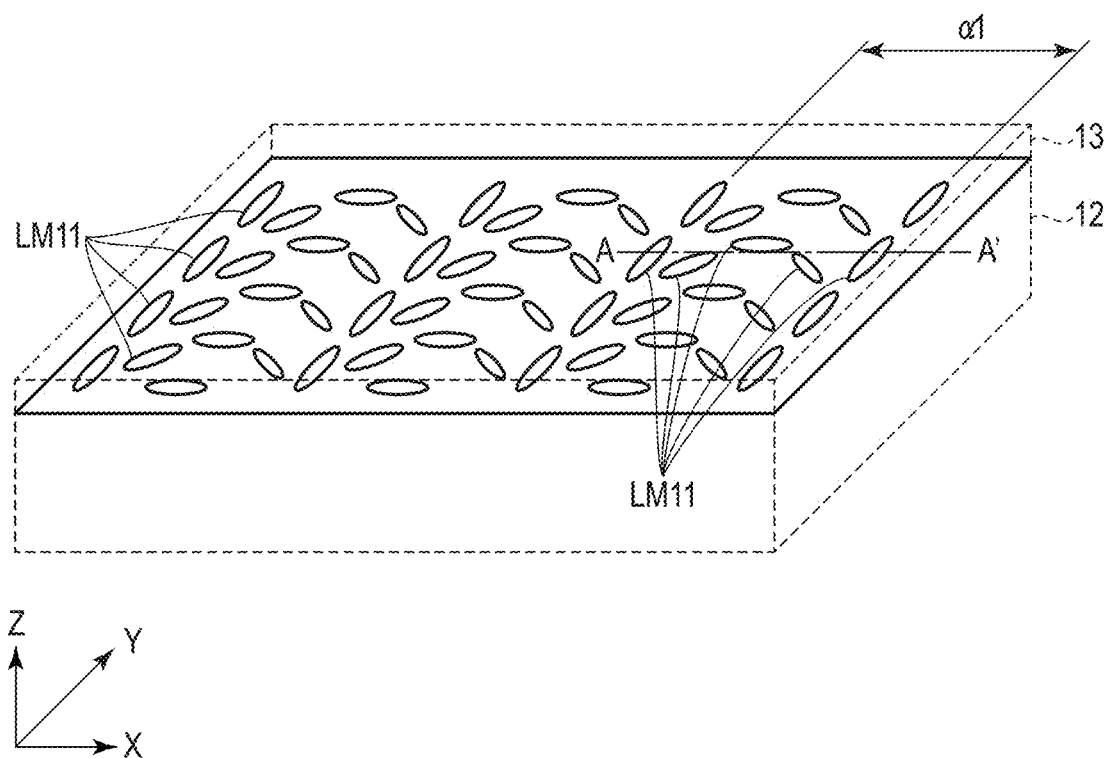
FIG. 5 is a view showing an example of an alignment pattern in the liquid crystal molecules LM11 shown in FIG. 4.

FIG. 5 is a view showing an example of an alignment pattern in the liquid crystal molecules LM11 shown in FIG. 4.

In the cholesteric liquid crystal layer 13, the alignment directions of the liquid crystal molecules LM11 arranged in the first direction X are different from each other. For example, when five liquid crystal molecules LM11 arranged along line A-A' are focused, the alignment direction of each of the liquid crystal molecules LM11 changes clockwise by a constant angle along the first direction X (from the left side to the right side in the drawing). In this example, the amount of change in the alignment directions of the liquid crystal molecules LM11 adjacent to each other is constant along the first direction X, but may gradually increase or decrease.

An interval between two liquid crystal molecules LM11 which the alignment directions of the liquid crystal molecules LM11 change by 180 degrees along the first direction X is defined as alignment pitch $\alpha 1$.

In contrast, the alignment directions of the respective liquid crystal molecules LM11 arranged in the second direction Y substantially correspond to each other, in the cholesteric liquid crystal layer 13. In other words, the spatial phase of the cholesteric liquid crystal layer 13 on the X-Y plane changes continuously along the first direction X and is substantially constant along the second direction Y.

Next, the optical action will be described using the cholesteric liquid crystal layer 13 as an example.

Figure 6:
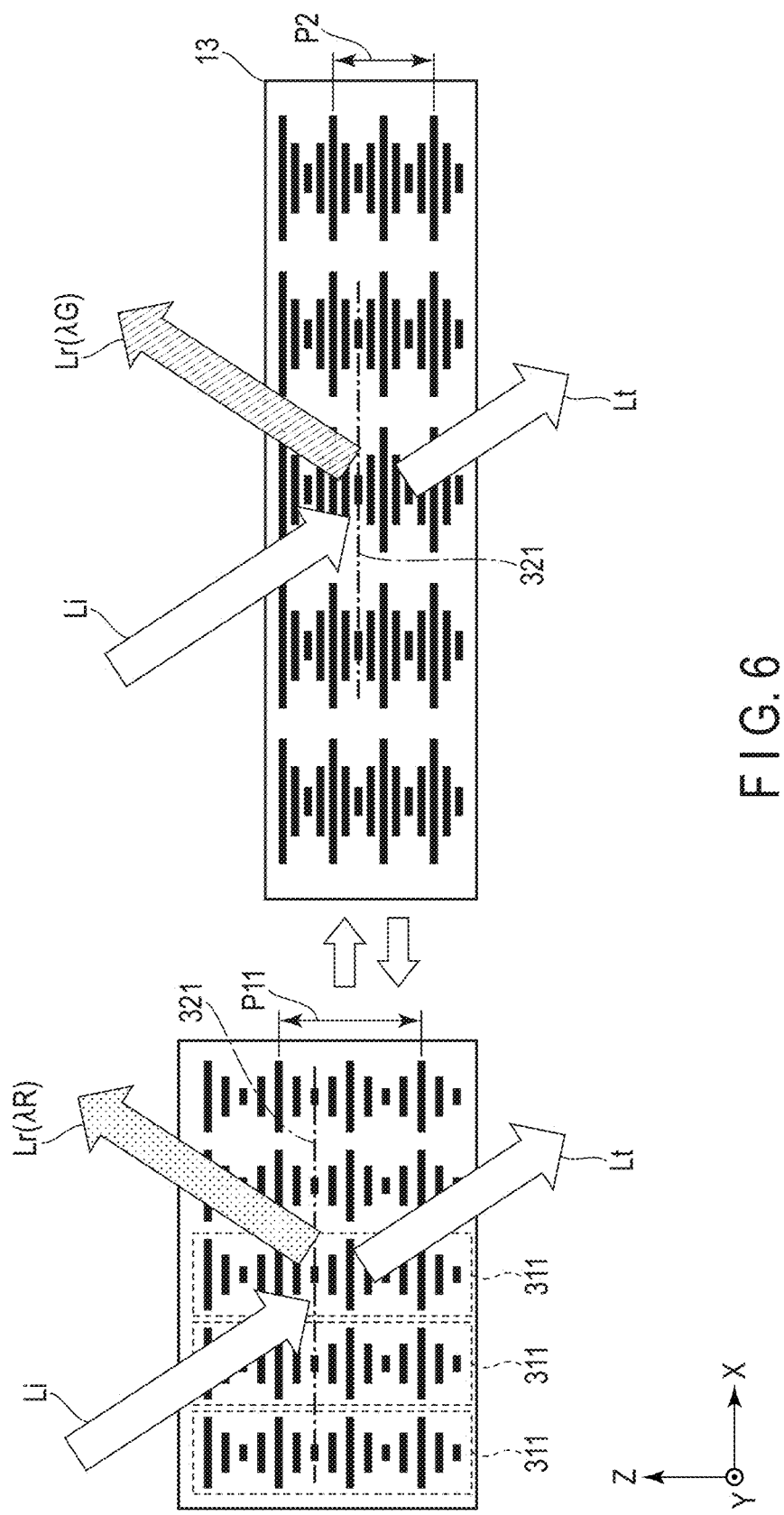
FIG. 6 is a view illustrating the optical action of the cholesteric liquid crystal layer 13.

FIG. 6 is a view illustrating the optical action of the cholesteric liquid crystal layer 13. The cholesteric liquid crystal layer 13 in an initial state (unstretched state) is shown on the left side of FIG. 6, and the cholesteric liquid crystal layer 13 in the stretched state is shown on the right side of the drawing.

In general, the selective reflection wavelength range $\Delta\lambda$ of the cholesteric liquid crystal 311 for vertically incident light is represented by "$\Delta n*P$", based on the helical pitch P and the refractive index anisotropy $\Delta n$ (i.e., a difference between the refractive index ne for extraordinary light and the refractive index no for ordinary light) of the cholesteric liquid crystal 311. A specific wavelength range of the selective reflection wavelength range $\Delta\lambda$ is a range (no*P to ne*P). A center wavelength $\lambda m$ of the selective reflection wavelength range $\Delta\lambda$ is represented by "nav*P", based on the helical pitch P and an average refractive index nav (=(ne+no)/2) of the cholesteric liquid crystal 311.

The cholesteric liquid crystal 311 in the initial state has the helical pitch P11 as described above. For example, the helical pitch P11 is set to reflect first circularly polarized light with red wavelength $\lambda R$ as the selective reflection wavelength range $\Delta\lambda$. For this reason, when a light Li is made incident on the cholesteric liquid crystal layer 13, a light Lr reflected on the reflective surface 321 is the first circularly polarized light with the red wavelength $\lambda R$. The other light LTt including second circularly polarized light with the red wavelength $\lambda R$ is transmitted through the reflective surface 321.

When the cholesteric liquid crystal layer 13 is stretched along the first direction X, the cholesteric liquid crystal 311 has a helical pitch P2 smaller than the helical pitch P11. For this reason, when the light Li is made incident on the cholesteric liquid crystal layer 13, the light Lr reflected on the reflective surface 321 is the first circularly polarized light having a wavelength shorter than the red wavelength $\lambda R$, for example, first circularly polarized light with green wavelength $\lambda G$. In other words, the selective reflection wavelength range $\Delta\lambda'$ in the stretched state shifts to the shorter wavelength side than the selective reflection wavelength range Δλ in the initial state. The other light beam LTt including the second circularly polarized light with the green wavelength λG is transmitted through the reflective surface 321.

Since the cholesteric liquid crystal layer 13 has stretchability, the layer restores to its initial state when released from the stretched state.

The above-described optical action means that the selective reflection wavelength range Δλ differs (i.e., the color of the reflected light differs) when the cholesteric liquid crystal layer 13 is in the initial state and the stretched state. In other words, the color of the reflected light from the liquid crystal element 100 changes according to the amount of stretch and the amount of distortion.

Next, a method of manufacturing the liquid crystal element 100 according to the present embodiment will be described with reference to FIG. 7 and FIG. 8.

Figure 7:
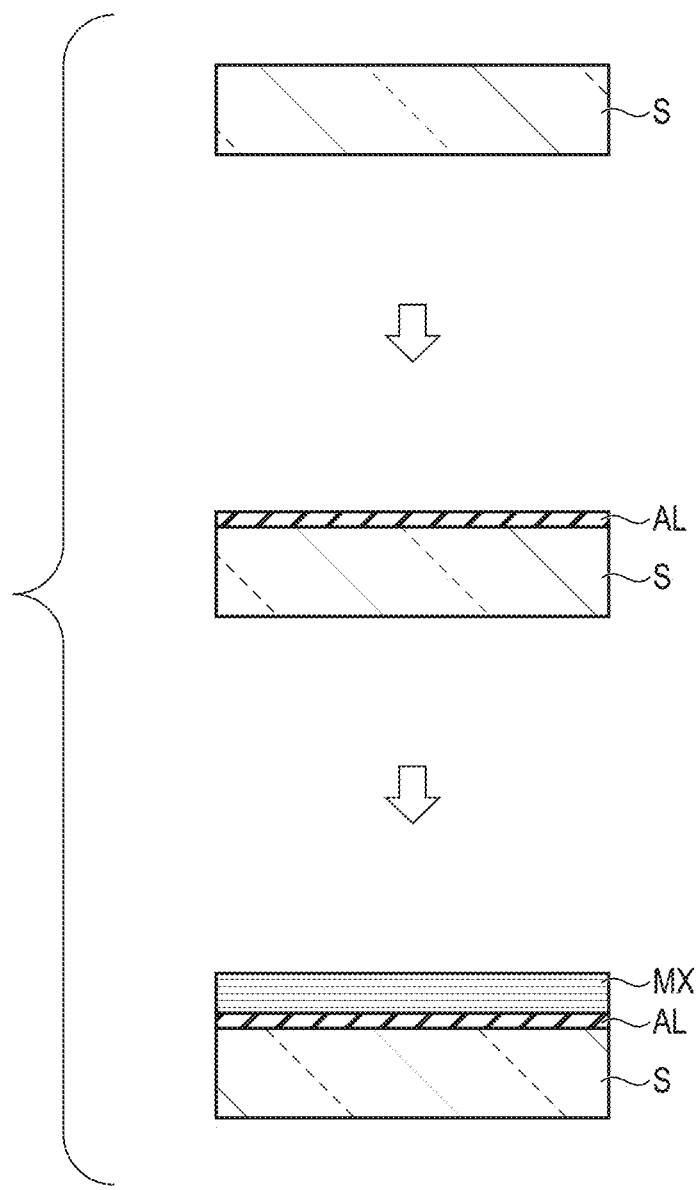
FIG. 7 is a view illustrating a method of manufacturing the liquid crystal element 100 according to the embodiment.
Figure 8:
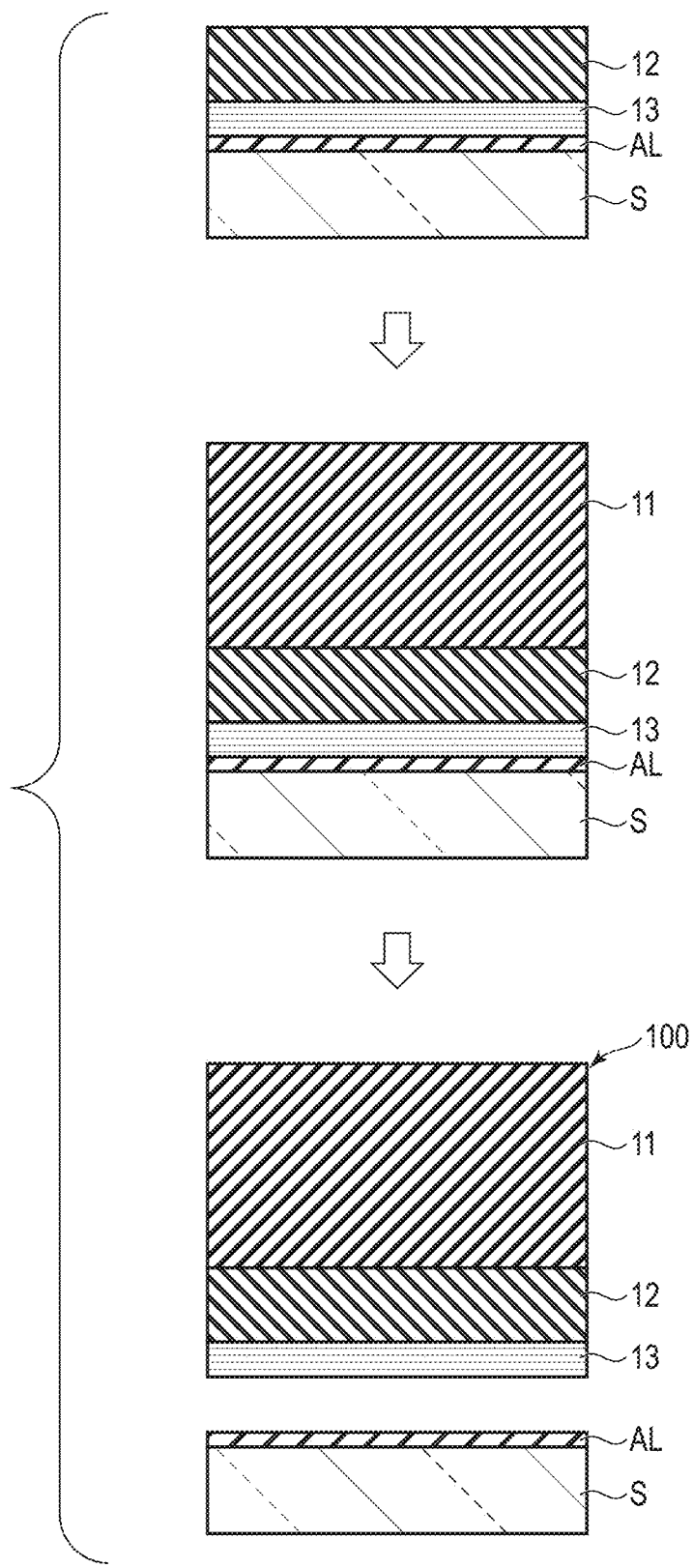
FIG. 8 is a view illustrating a method of manufacturing the liquid crystal element 100 according to the embodiment.

First, as shown in the upper part of FIG. 7, a washed support body S is prepared. The support body S is an unstretchable substrate and is formed of transparent inorganic glass such as alkali-free glass, soda lime glass, borosilicate glass, and quartz glass, transparent resin such as acrylic, polyethylene terephthalate, polycarbonate, and polyvinyl chloride, colored inorganic glass, colored resin, or the like. In one example, the support body S is formed of alkali-free glass and has a thickness of 0.5 mm.

Subsequently, an alignment layer AL is formed on the support body S as shown in the middle part of FIG. 7. A method of forming the alignment layer AL will be described here.

A thin film is formed on the support body S. The thin film is formed of polyimide, polyvinyl alcohol, diamond-like carbon, or the like. After that, the thin film is subjected to an alignment treatment. Rubbing treatment, photo-alignment treatment, or the like can be applied as the alignment treatment.

One of methods of photo-alignment treatment is a method of emitting linearly polarized ultraviolet rays to a thin film. By applying this method, an alignment pattern can be formed such that the alignment directions of the liquid crystal molecules adjacent to the alignment layer AL are arranged in one direction as described with reference to FIG. 3.

In addition, another method of photo-alignment treatment is a method of emitting an interference pattern of right-handed circularly polarized ultraviolet rays and left-handed circularly polarized ultraviolet rays to the thin film. By applying this method, a complicated alignment pattern in which the alignment directions of liquid crystal molecules adjacent to the alignment layer AL continuously change can be formed as described with reference to FIG. 5.

In one example, the thin film is a polyimide film and has a thickness of 100 nm. A photo-alignment treatment has been applied as the alignment treatment.

Alternatively, the alignment layer AL can also be formed by other methods.

In other words, a photocurable resin is applied onto the support body S, a mold having fine uneven parts formed in advance is stacked on the photocurable resin, and the mold is removed after emitting ultraviolet rays while applying pressure. As a result, the photocurable resin is cured into a shape corresponding to the uneven parts of the mold, and a structure having fine uneven parts is formed as the alignment layer AL. According to such a method, the alignment treatment is unnecessary.

Subsequently, the cholesteric liquid crystal layer 13 is formed on the alignment layer AL. A method of forming the cholesteric liquid crystal layer 13 will be described here.

A liquid crystal mixture MX for forming the cholesteric liquid crystal layer 13 is prepared. The liquid crystal mixture MX is formed by mixing a solvent with a liquid crystal monomer, a chiral monomer, a plasticizer, a cross-linking agent, and a photoinitiator. Organic solvents such as hexane, cyclohexane, cyclohexanone, heptane, toluene, anisole, and propylene glycol monomethyl ether acetate (PGMEA) can be used as the solvent.

Then, the liquid crystal mixture MX is applied on the alignment layer AL as shown in the lower part of FIG. 7. The other member does not need to be stacked on the applied liquid crystal mixture MX. The liquid crystal molecules close to the alignment layer AL are aligned in a predetermined direction by the alignment restriction force of the alignment layer AL. After that, the solvent is removed, the liquid crystal mixture MX is temporarily cured, and ultraviolet rays are applied in a state in which the liquid crystal mixture MX exhibits a cholesteric liquid crystal phase. The cholesteric liquid crystal layer 13 having stretchability is thereby is formed. In one example, the cholesteric liquid crystal layer 13 has a thickness of approximately 4 μm in the initial state.

Subsequently, the adhesive layer 12 is formed on the cholesteric liquid crystal layer 13 as shown in the upper part of FIG. 8. In one example, a material containing a modified silicone-based resin as a main component has been applied as the adhesive layer 12. The thickness of the adhesive layer 12 applied on the cholesteric liquid crystal layer 13 is greater than the thickness of the cholesteric liquid crystal layer 13 (approximately 4 μm) and is, for example, approximately 50 μm.

Subsequently, the substrate 11 having stretchability is adhered with the adhesive layer 12 as shown in the middle part of FIG. 8. In one example, a film formed of transparent silicone rubber has been applied as the substrate 11. The substrate 11 has a thickness of 0.2 mm.

Subsequently, after the adhesive layer 12 is cured, the cholesteric liquid crystal layer 13 is peeled off from the alignment layer AL as shown in the lower part of FIG. 8. The adhesive force between the alignment layer AL and the cholesteric liquid crystal layer 13 is smaller than the adhesive force between the adhesive layer 12 and the cholesteric liquid crystal layer 13. For this reason, the cholesteric liquid crystal layer 13 can easily be peeled off from the alignment layer AL without applying energy such as light or heat.

The liquid crystal element 100 described with reference to FIG. 1 is manufactured through the above-described processes.

According to the present embodiment, the liquid crystal element 100 having stretchability can easily be manufactured by transferring the cholesteric liquid crystal layer 13 formed on the unstretchable support body to the stretchable substrate 11. In addition, a complicated alignment pattern can be formed by applying the photo-alignment treatment in the process of forming the alignment layer AL.

Figure 9:
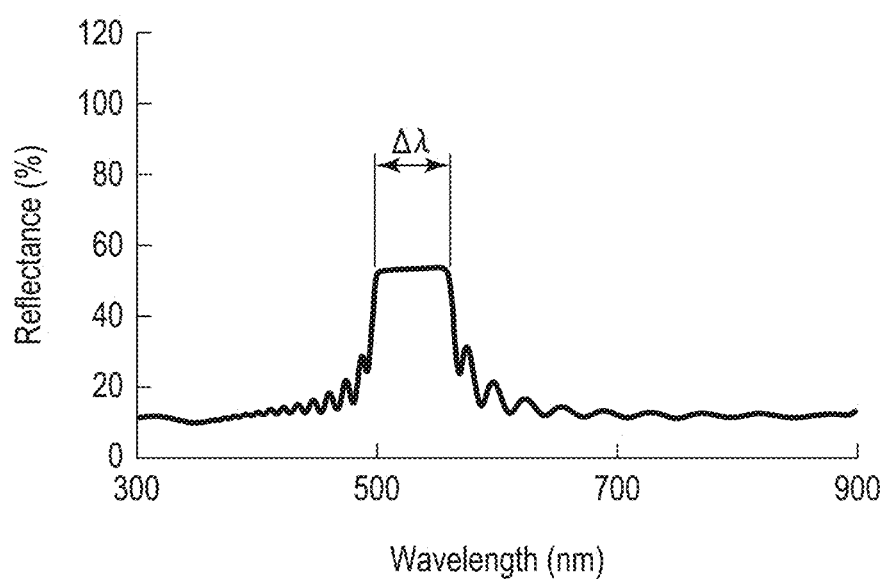
FIG. 9 is a view showing an example of reflection spectrum of the liquid crystal element 100 of the embodiment.

FIG. 9 is a graph showing an example of the reflection spectrum of the liquid crystal element 100 of the present embodiment.

The horizontal axis in the graph indicates the wavelength (nm), and the vertical axis in the graph indicates the reflectance (%). The reflection spectrum shown here is the result of measurement of the liquid crystal element 100 in the initial state.

The refractive anisotropy Δn of the cholesteric liquid crystal 311 is 0.2. The selective reflection wavelength range Δλ is approximately 70 nm, based on the measurement result of the reflection spectrum. For this reason, the helical pitch P of the cholesteric liquid crystal layer 311 is estimated to be approximately 350 nm.

In the case where the liquid crystal element 100 is required to emphasize the change in color of the reflected light in response to a slight change in the amount of stretch, a smaller selective reflection wavelength range Δλ is desirable. In order to achieve this, it is required to reduce the refractive anisotropy Δn or the helical pitch P. The refractive anisotropy Δn is, for example, in a range of 0.05 to 0.25, desirably in a range of 0.05 to 0.15, more desirably in a range of 0.05 to 0.1. The helical pitch P can be adjusted by the material and molar ratio of chiral monomers mixed in the process of manufacturing the cholesteric liquid crystal layer 13.

Application Example

Figure 10:
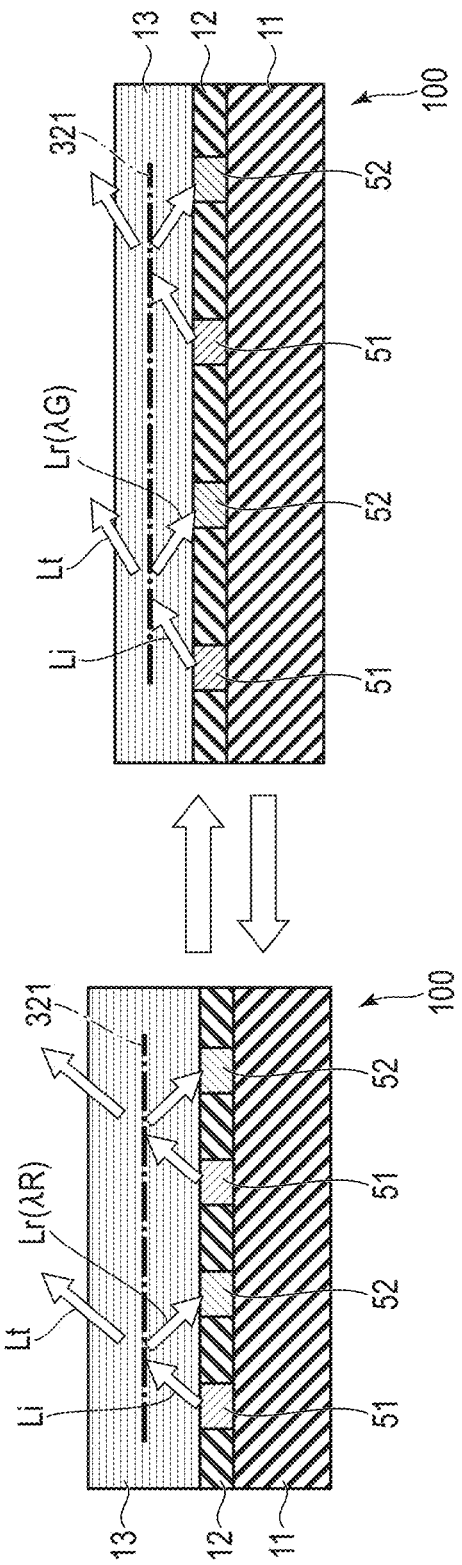
FIG. 10 is a cross-sectional view illustrating an application example of the liquid crystal element 100.

FIG. 10 is a cross-sectional view illustrating an application example of the liquid crystal element 100. The liquid crystal element 100 in an initial state (unstretched state) is shown on the left side of FIG. 10, and the liquid crystal element 100 in the stretched state is shown on the right side of FIG. 10.

The liquid crystal element 100 comprises light emitting elements 51 and light receiving elements 52. The light emitting elements 51 and the light receiving elements 52 are arranged between the substrate 11 and the cholesteric liquid crystal layer 13. The light emitting elements 51 are configured to emit white light toward the cholesteric liquid crystal layer 13. The light receiving elements 52 are configured to output an electrical signal according to the wavelength and intensity of detected visible light.

The liquid crystal element 100 in the initial state is set such that the reflective surface 321 of the cholesteric liquid crystal layer 13 reflects the first circularly polarized light having the red wavelength λR. For this reason, when the white light Li emitted from the light emitting elements 51 is made incident on the cholesteric liquid crystal layer 13, the light Lr, which is the first circularly polarized light having the red wavelength λR, is reflected on the reflective surface 321. The other light Lt is transmitted through the reflective surface 321. The light receiving elements 52 detect the light Lr reflected on the reflective surface 321 and output an electrical signal corresponding to the wavelength and intensity of the light Lr.

The stretched liquid crystal element 100 reflects the first circularly polarized light having a shorter wavelength than the red wavelength on the reflective surface 321 of the cholesteric liquid crystal layer 13. For this reason, when the white light Li emitted from the light emitting elements 51 is made incident on the cholesteric liquid crystal layer 13, for example, the light Lr, which is the first circularly polarized light having the green wavelength λG, is reflected on the reflective surface 321. The other light Lt is transmitted through the reflective surface 321. The light receiving elements 52 detect the light Lr reflected on the reflective surface 321 and output an electrical signal corresponding to the wavelength and intensity of the light Lr.

The light receiving elements 52 are connected to a host computer. The host computer can detect whether the liquid crystal element 100 is in the initial state or the stretched state, based on the electrical signal output from the light receiving elements 52. In addition, when the liquid crystal element 100 is in the stretched state, the host computer can detect the amount of stretch of the liquid crystal element 100, based on the electrical signal output from the light receiving elements 52.

As described above, according to the present embodiment, a liquid crystal element having stretchability and a manufacturing method for easily manufacturing the liquid crystal element can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal element manufacturing method comprising:
   forming an alignment layer on a support body;
   forming a cholesteric liquid crystal layer on the alignment layer;
   forming an adhesive layer on the cholesteric liquid crystal layer;
   adhering a substrate having stretchability by the adhesive layer; and
   peeling the cholesteric liquid crystal layer from the alignment layer, wherein
   the forming the alignment layer includes:
   emitting circularly polarized ultraviolet rays to a polyimide film formed on the support body such that alignment directions of liquid crystal molecules close to the alignment layer change continuously.

2. The liquid crystal element manufacturing method of claim 1, wherein
   the forming the cholesteric liquid crystal layer includes:
   preparing a liquid crystal mixture obtained by mixing a liquid crystal monomer, a chiral monomer, a plasticizer, a cross-linking agent, and a photoinitiator;
   applying the liquid crystal mixture onto the alignment layer; and
   emitting ultraviolet rays in a state in which the liquid crystal mixture exhibits a cholesteric liquid crystal phase.

3. The liquid crystal element manufacturing method of claim 1, wherein
   the forming the alignment layer includes:
   emitting linearly polarized ultraviolet rays to a polyimide film formed on the support body such that alignment directions of liquid crystal molecules close to the alignment layer are arranged in one direction.

4. A liquid crystal element manufacturing method comprising:
   forming an alignment layer on a support body;
   forming a cholesteric liquid crystal layer on the alignment layer;
   forming an adhesive layer on the cholesteric liquid crystal layer;
   adhering a substrate having stretchability by the adhesive layer; and
   peeling the cholesteric liquid crystal layer from the alignment layer, wherein
   the forming the alignment layer includes:

applying a photocurable resin onto the support body, stacking a mold having uneven parts on the photocurable resin, and emitting ultraviolet rays while applying pressure.

5. A liquid crystal element comprising:
a substrate having stretchability;
an adhesive layer arranged on the substrate;
a first cholesteric liquid crystal layer containing a plasticizer and a photoinitiator, being adhered to the adhesive layer, and having stretchability; and
a light emitting element and a light receiving element arranged between the substrate and the first cholesteric liquid crystal layer.

6. A liquid crystal element comprising:
a substrate having stretchability;
an adhesive layer arranged on the substrate;
a first cholesteric liquid crystal layer containing a plasticizer, being adhered to the adhesive layer, and having stretchability; and
a second cholesteric liquid crystal layer arranged on the first cholesteric liquid crystal layer, wherein
cholesteric liquid crystals which are included in the first cholesteric liquid crystal layer and the second cholesteric liquid crystal layer, respectively, swirl in directions opposite to each other and have an equal helical pitch.

7. A liquid crystal element comprising:
a substrate having stretchability;
an adhesive layer arranged on the substrate;
a first cholesteric liquid crystal layer containing a plasticizer, being adhered to the adhesive layer, and having stretchability; and
a light emitting element and a light receiving element arranged between the substrate and the first cholesteric liquid crystal layer.

8. The liquid crystal element of claim 5, wherein
the substrate is formed of a rubber material or a thermoplastic elastomer.

9. The liquid crystal element of claim 5, wherein
the adhesive layer is formed of any one of acrylic resin, enethiol resin, epoxy resin, silicone resin, polyvinyl alcohol resin, polyvinyl acetal resin, and polyvinyl butyral resin.

10. The liquid crystal element of claim 5, wherein
the first cholesteric liquid crystal layer comprises single-component nematic liquid crystal or nematic liquid crystal comprised of a plurality of components, as the plasticizer.

11. The liquid crystal element manufacturing method of claim 4, wherein
the forming the cholesteric liquid crystal layer includes:
preparing a liquid crystal mixture obtained by mixing a liquid crystal monomer, a chiral monomer, a plasticizer, a cross-linking agent, and a photoinitiator;
applying the liquid crystal mixture onto the alignment layer; and
emitting ultraviolet rays in a state in which the liquid crystal mixture exhibits a cholesteric liquid crystal phase.

12. The liquid crystal element manufacturing method of claim 4, wherein
the forming the alignment layer includes:
emitting linearly polarized ultraviolet rays to a polyimide film formed on the support body such that alignment directions of liquid crystal molecules close to the alignment layer are arranged in one direction.

* * * * *